Patented Apr. 22, 1952

2,593,928

UNITED STATES PATENT OFFICE 2,593,928

DIMENSIONALLY STABLE DIAZOTYPE PHOTOGRAPHIC FILM AND PROCESS FOR MAKING IT

Sam C. Slifkin, Binghamton, N. Y., assignor to General Aniline & Film Corporation, New York, N. Y., a corporation of Delaware No Drawing. Application October 9, 1947, Serial No. 778,748

5 Claims. (Cl. 95—9)

This invention relates to diazotype photoprinting material, which is of improved dimensional stability when subjected to development or to the influence of moisture, or both, so that it yields dimensionally accurate undistorted reproductions of originals to be copied; and to a process for producing diazotype photoprinting material having the aforesaid dimensional stability.

Diazotype photoprinting materials, currently employed, usually comprise a suitable base or carrier, bearing a diazotype sensitizing composition, i. e., a composition comprising a light-sensitive diazo compound, capable of yielding a colored azo derivative upon coupling with a suitable azo coupling component, and susceptible to alteration or decomposition upon exposure to light so as to destroy its aforesaid color forming properties. Upon exposure of such sensitized materials to light of locally varied intensity according to a chosen pattern, as by exposure under a line drawing, printed matter or a photographic transparency to be reproduced, the diazo compound in the illuminated areas is partly or completely destroyed and rendered incapable of coupling. Upon development of the residual diazo compound with an azo coupling component, a colored image of the original is formed. Diazotype sensitizing compositions often include a coupling component incorporated with the light-sensitive diazo compound, the composition being stabilized against coupling prior to development. The sensitized material can be developed, after exposure to light, by a dry process wherein it is exposed to alkaline vapor such as ammonia, or by wet or semi-wet processes in which the material is treated with an aqueous (generally alkaline) developing solution. When the sensitized material contains the diazo component without a coupling component, the later can be applied in a wet or semi-wet developer solution.

In making diazotype copies wherein accurate dimensional reproduction of an original is required, as in the preparation of color separations which are to be subsequently combined to yield a composite multicolor image, or in map making wherein adjacent portions of the map sections must register accurately at their contiguous margins, diazotype photoprinting material is required having dimensional stability during development, as well as during handling and storage under atmospheric conditions. While dimensional stability in some respects can be obtained by providing laminated structures including a dimensionally stable support layer, and a separate sensitized layer, such structures are often too stiff or heavy for many of the uses for which they are desired, are relatively expensive to manufacture, and are often lacking in durability during storage or handling. If the thickness of the dimensionally stable support layer in such laminated structures is reduced, the stability of the structure is ordinarily lost.

It has been proposed to incorporate diazotype sensitizing compositions in self-sustaining films of certain plastics such as cellulose acetate or regenerated cellulose, by impregnation with a solution of the diazotype composition in a solvent adapted to penetrate the plastic material of the film. Water, however, is required as one component of the solvent to maintain the sensitizing materials in solution, while organic solvents having a swelling or dissolving action on the material of the film are included to render the solution capable of impregnating the film. Plastic materials heretofore proposed for treatment by this method, however, do not yield dimensionally stable diazotype materials. Thus, distinctly hydrophilic plastics such as regenerated cellulose, which can be relatively easily impregnated with aqueous alcoholic solutions of diazotype components, are exceedingly unstable to stretching or distortion during handling, and change their dimensions when exposed to moisture of the atmosphere or aqueous development solutions, or upon development with alkaline vapors such as ammonia. In the case of relatively water-resistant cellulose ester films such as cellulose acetate, impregnation with diazotype sensitizing components can be carried out by using a mixed solvent containing water and various water-soluble low-boiling organic solvents such as methanol, ethanol, acetone, acetic acid or ethyl lactate which have a swelling action on such esters. However, cellulose acetates which can be satisfactorily impregnated and sensitized in this manner are limited to those capable of swelling in a solvent mixture containing substantial amounts of water, and such cellulose acetate films are not dimensionally stable under conditions obtaining during development, handling and storage.

I have discovered that dimensionally stable diazotype photoprinting material can be obtained by providing a pre-formed self-sustaining film of a water-insoluble cellulose ether (e. g. alkyl ethers of cellulose containing more than 1 carbon atom in the alkyl group) and preferably of ethyl cellulose, having at least one surface of the film impregnated with a solution of a diazotype sensitizing composition in an aqueous solvent containing a volatile high-boiling organic swelling agent or solvent for said cellulose ether, whose swelling action is preserved despite inclusion of relatively large amounts of water in the impregnating composition.

Thus, as disclosed in my copending application, Serial No. 661,864 of April 12, 1946, now abandoned, of which this application is a continuation in part, gamma-lactones, particularly those containing 4 to 6 carbon atoms (e. g. gamma-butyrolactone, gamma-valerolactone, gamma-caprolactone and their water-soluble derivatives such as alpha-methyl-gamma-butyrolactone) are particularly suitable for admixture with aqueous diazotype sensitizing solutions, and such solutions can be used for impregnation of an insoluble cellulose ether base such as an ethyl cellulose film. As distinguished from the solvents theretofore proposed, the aforesaid lactones are relatively high-boiling swelling agents for cellulose derivatives, which retain their swelling action on a cellulose ether when admixed with water or aqueous solutions in the proportions required to dissolve diazotype sensitizing compositions. When such impregnation is carried out with solutions containing the aforesaid gamma-lactones, the concentration of the sensitizing composition in the solution can be decreased, and evaporation of the solvent retarded, sufficiently to prevent formation of a surface scum on the film.

A sensitizing solution containing a lactone of the aforesaid type can be applied to the sheet of insoluble cellulose ether by any of the impregnation procedures commonly employed. For example, to impregnate one side of the sheet, the solution can be applied by drawing the sheet across the surface of the solution, and removing the excess by means of a doctor blade; or, if both sides are to be impregnated, the sheet can be drawn across the surface of or through the sensitizing solution (known as "bead" or "dip coating"), the excess drained off, and the sheet allowed to dry. The solvent preferably contains about 5 to 20% or more of the high-boiling water-soluble swelling agent, e. g. gamma-valerolactone, and contains sufficient water, e. g. 40% or more to maintain the sensitizing components in solution. Other auxiliary solvents such as dioxane, butanol-1 or other solvents can be added to the solvent mixture.

The sensitizing compositions heretofore proposed for impregnating plastic materials such as cellulose acetate, which failed to yield dimensionally stable materials, are unsuitable for impregnating the water-insoluble cellulose ether films of this invention, since the organic solvents previously proposed for use in such compositions do not possess adequate swelling power for the cellulose ethers when diluted with sufficient water to maintain an adequate amount of the sensitizing components in solution.

The sensitized insoluble cellulose ether films of my invention can be exposed to light under an original to be reproduced thereon, developed by exposure to alkaline vapors such as ammonia in a dry process, without distortion or alteration of their dimensions. For example, it was found that the change in length during development of a 3-ft. print made with a diazotype sensitized cellulose ether film in accordance with my invention was less than 0.1 mm. Moreover, the resulting copies continue to maintain their dimensional stability during handling and storage, since they are unaffected by atmospheric moisture or other agencies.

Preferred procedures for making the diazotype photoprinting material of my invention are illustrated by the following examples, wherein parts and percentages are by weight, unless otherwise indicated:

*Example 1*

A film of ethyl cellulose was coated on one or both sides with the following diazotype sensitizing composition:

40 cc. water
10 cc. gamma-valerolactone
10 cc. isopropanol
10 cc. butanol-1
5 g. sulfosalicylic acid
5 cc. formic acid
1 g. zinc chloride
4 g. thiourea
1 g. saponin
1 g. 2,3-dihydroxynaphthalene
5 g. zinc chloride double salt of 4-diazo-3-ethoxy-N,N-diethyl aniline, and the film subsequently dried in the usual manner. On exposure under a suitable original, and development by exposure to ammonia vapor, a blue positive image was produced which was a dimensionally accurate reproduction of the original. The resulting copy continued to maintain its dimensional stability reliably during handling and storage.

*Example 2*

A sensitizing solution was prepared having the following composition:

30 cc. water
20 cc. gamma-valerolactone
10 cc. butanol-1
10 g. tartaric acid
5 cc. formic acid
1 g. saponin
2 g. resorcinol
2 g. zinc chloride double salt of p-diazo-N-monoethyl-2-methyl aniline.

A sheet of ethyl cellulose film was impregnated with the foregoing solution by the dip-coating method and dried. Upon placing the sensitized film in contact with an original to be reproduced, exposing to light, and developing with ammonia vapor, an orange image of brilliant color and good aging qualities was produced, said image being a dimensionally accurate reproduction of the original. The print had dimensional stability similar to that of Example 1.

In the foregoing examples, gamma-butyrolactone, gamma-caprolactone, or water-soluble derivatives of these lactones or of gamma-valerolactone can be substituted for the gamma-valerolactone of the examples, in similar amounts.

In the foregoing examples, any combination of light-sensitive diazo compounds and azo coupling components, suitable for the preparation of diazotype light-sensitive layers, can be substituted for the compounds therein disclosed. Diazo compounds suitable for such compositions are, for example, those derived from 1,2- and 2,1-aminonaphthols, and aromatic para-diamines of the benzene series, particularly those which contain one or two substituents on the undiazotized amino groups. Examples of such diazo compounds commonly employed for producing diazotype images are the diazo derivatives of p-amino-N-methyl aniline, p-amino-N-ethoxy aniline, p-amino-N-ethyl-N-ethoxy aniline, 4-amino-2-methoxy-N-cyclohexyl aniline, p-amino-N,N-diethyl-m-toluidine, 3-amino-carbazole, 1-amino-2-naphthol-4-sulfonic acid, and 2-amino -1-hydroxy - 3,6-naphthalene-disulfonic acid. Azo coupling components which are suitable and commonly employed in such compositions include 2,3-dihydroxy-naphthalene or its 6-sulfonic acid, $\beta$-naphthol-3,6-disulfonic acid, 1,7-aminonaphthol, 2,7-dihydroxy-naphthalene, 2-hydroxynaphthalene-8-biguanide, 1-amino-8-naphthol-3,6-disulfonic acid, phloroglucinol and resorcinol.

Stabilizers, generally included in such diazotype compositions, such as sulfosalicylic acid, tartaric acid, formic acid or thiourea, and salts such as nickel sulfate for modifying the properties of the dyestuff produced upon exposure to light and development can likewise be incorporated in the sensitizing compositions used for impregnating cellulose ether films in accordance with this invention. Moreover, auxiliary solvents for the sensitizing components can be added, such as water-soluble alcohols, e. g., ethanol, isopropanol, butanol-1 and the like.

By virtue of its properties, the photoprinting material of my invention is suitable for use in making color separations which must register accurately with each other for combination of the images. Similarly, they can be used in making maps, wherein accurate registry at the margins between the copies of adjacent sections is required.

Various changes can be made in the treatment solutions of the foregoing examples, and in the method of applying them to the cellulose ether films without departing from the nature or scope of my invention.

I claim:

1. A dimensionally stable photoprinting material, consisting of a self-sustaining pre-formed film of a water-insoluble cellulose ether, having at least one surface thereof impregnated with an aqueous solution of a diazotype sensitizing composition containing a gamma-lactone of 4 to 6 carbon atoms in an amount constituting at least 5% of the solvent components.

2. A dimensionally stable photoprinting material, consisting of a self-sustaining pre-formed film of ethyl cellulose, having at least one surface thereof impregnated with an aqueous solution of a diazotype sensitizing composition containing gamma-valerolactone in an amount constituting at least 5% of the solvent components.

3. A process for making dimensionally stable photoprinting material, which comprises impregnating a self-sustaining pre-formed film of a water-insoluble cellulose ether with an aqueous solution of a diazotype sensitizing composition containing a gamma-lactone of 4 to 6 carbon atoms in an amount constituting at least 5% of the solvent components; and drying the resulting film.

4. A process for making dimensionally stable photoprinting material, which comprises impregnating a self-sustaining pre-formed film of a water-insoluble cellulose ether with an aqueous solution of a diazotype sensitizing composition containing gamma-valerolactone in an amount constituting at least 5% of the solvent components; and drying the resulting film.

5. A process for making dimensionally stable photoprinting material, which comprises impregnating a self-sustaining pre-formed film of ethyl cellulose with an aqueous solution of a diazotype sensitizing composition containing gamma-valerolactone in an amount constituting at least 5% of the solvent components; and drying the resulting film.

SAM C. SLIFKIN.

REFERENCES CITED

The following references are of record in the file of this patent:

UNITED STATES PATENTS

| Number | Name | Date |
|---|---|---|
| 2,374,563 | Reichel | Apr. 24, 1945 |
| 2,496,196 | Botkin | Jan. 31, 1950 |

FOREIGN PATENTS

| Number | Country | Date |
|---|---|---|
| 390,616 | Great Britain | Apr. 13, 1933 |
| 536,714 | Great Britain | May 23, 1941 |
| 563,804 | Great Britain | Aug. 30, 1944 |